(12) United States Patent
Mendoza et al.

(10) Patent No.: US 10,232,453 B2
(45) Date of Patent: Mar. 19, 2019

(54) BATTERY PLATE CUTTER SYSTEM AND METHOD

(71) Applicant: Wirtz Manufacturing Company, Inc., Port Huron, MI (US)

(72) Inventors: Roel Mendoza, Palms, MI (US); Dustin James Allen, Croswell, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 31 days.

(21) Appl. No.: 15/599,686

(22) Filed: May 19, 2017

(65) Prior Publication Data

US 2017/0341163 A1 Nov. 30, 2017

Related U.S. Application Data

(60) Provisional application No. 62/341,750, filed on May 26, 2016.

(51) Int. Cl.
| | |
|---|---|
| *B23D 25/12* | (2006.01) |
| *B23D 33/12* | (2006.01) |
| *B23D 33/02* | (2006.01) |
| *H01M 4/02* | (2006.01) |
| *G05B 19/18* | (2006.01) |
| *B23D 36/00* | (2006.01) |

(Continued)

(52) U.S. Cl.
CPC ........... *B23D 36/005* (2013.01); *B23D 25/12* (2013.01); *B23D 33/02* (2013.01); *B23D 33/12* (2013.01); *G05B 19/182* (2013.01); *H01M 4/20* (2013.01); *G05B 2219/49381* (2013.01); *H01M 10/12* (2013.01)

(58) Field of Classification Search
CPC .. B26D 1/12; B26D 7/27; Y10T 83/04; Y10T 83/1488; Y10T 83/155; Y10T 83/159; Y10T 83/4691; Y10T 83/768; Y10T 83/9309; Y10T 83/9312; B23D 25/12; B23D 33/02; B23D 33/12; B23D 36/005; G05B 19/182; G05B 2219/49381; H01M 4/20; H01M 10/12
See application file for complete search history.

(56) References Cited

U.S. PATENT DOCUMENTS

| | | | | |
|---|---|---|---|---|
| 4,020,406 A | * | 4/1977 | Tokuno | B23D 36/005 318/600 |
| 4,308,773 A | * | 1/1982 | McDowell | B23D 25/12 83/13 |

(Continued)

*Primary Examiner* — Phong H Nguyen

(57) ABSTRACT

A system, apparatus and method for cutting battery grids or plates from a continuous strip of a plurality of connected battery grids. The continuous strip moves toward a rotating cutter with at least two cutter blades with cutting edges equally circumferentially spaced apart and extending parallel to the cutter axis of rotation and a rotating cooperating anvil. The cutting edges and the anvil are rotated at the same tangential speed to cut in a nip between them a plate or grid from the continuous strip of connected grids. At a point upstream of the cutter, an electric signal indicative of each lug of the grid of the continuous strip moving past this point is used to control the speed of movement of the strip through the nip to cut a plate or grid from the continuous strip at a longitudinal speed which is essentially the same as the tangential speed of the cutting edges.

7 Claims, 7 Drawing Sheets

(51) Int. Cl.
  *H01M 4/20*   (2006.01)
  *H01M 10/12*  (2006.01)

(56) References Cited

U.S. PATENT DOCUMENTS

| | | | | |
|---|---|---|---|---|
| 4,497,229 | A | * | 2/1985 | Carrington ............... B26D 5/26 |
| | | | | 700/167 |
| 4,606,383 | A | | 8/1986 | Yanik |
| 4,781,090 | A | * | 11/1988 | Feldkamper ............. B26D 5/32 |
| | | | | 83/312 |
| 9,397,331 | B2 | * | 7/2016 | Mendoza ................ H01M 4/20 |
| 2012/0055297 | A1 | * | 3/2012 | Pedercini ............... B26D 5/007 |
| | | | | 83/13 |
| 2014/0083562 | A1 | | 3/2014 | Mendoza et al. |

\* cited by examiner

BATTERY PLATE CUTTER SYSTEM AND METHOD

This application claims the benefit of U.S. Provisional 62/341,750 filed on May 26, 2016 which is incorporated herein by reference in its entirety.

TECHNICAL FIELD

This disclosure relates generally to lead-acid battery manufacturing and assembly equipment and processes, and more particularly to battery plate cutting equipment, systems and processes.

BACKGROUND

Lead-acid batteries are a common source of electrical energy and are often used as automotive batteries, marine batteries, consumer equipment batteries, industrial batteries, and in other applications. Among other components, lead-acid batteries include numerous plates that are assembled in a case and that are made of lead alloy grids with an electrochemically active battery paste material applied on the grids. In mass production the grids are usually formed in an elongate continuous strip of a plurality of individual grids connected or formed together. The grid strip is fed through a pasting machine where the battery paste material is applied to the strip of grids. Downstream of the application of the paste the pasted grids are cut or separated into individual pasted plates.

Even though in the manufacture of a continuous strip of grids, each grid is intended to be of the same longitudinal length, portions of the strip will often be somewhat stretched and thus the longitudinal length of the grids may vary somewhat throughout the length of the grid strip. Moreover, even if and when the grids of the continuous strip are of the same longitudinal length, prior art cutting machines typically do not register precisely with the intended locations at which the pasted grids of the strip are cut into individual plates. In at least some of these cutting machines and systems, the longitudinal length or misalignment may vary as much as plus or minus 0.04 of an inch from their intended longitudinal length which results in some individual plates being as much as 0.08 of an inch longer than other plates cut from the same continuous strip of pasted grids. This variation in the longitudinal length of individual plates presents problems in the assembly of a plurality of the plates into the case of a lead-acid battery and may even degrade the performance of and shorten the useful life in service of a battery. This misalignment will decrease the width of a portion of the perimeter frame (typically a side) of a pasted plate thereby increasing the likelihood of a shortened battery life due to the effects of corrosion of the lead grid of such a battery plate.

SUMMARY

In at least some implementations, a process for cutting plates from a continuous strip of a plurality of connected grids may include rotating a cutter with an axis of rotation and at least two cutter blades with cutting edges equally circumferentially spaced apart and extending substantially parallel to the axis of rotation, rotating an anvil with an axis of rotation substantially parallel to the axis of rotation of the cutter, moving at a longitudinal speed at least a portion of a continuous strip of a plurality of battery grids connected together toward a nip between each cutting edge and the anvil, at a point upstream of the cutter providing an electric signal indicative of each lug of a grid of the continuous strip that is moved past the point, and using at least this electric signal to control rotation of the cutter and anvil so that as each cutting edge of each cutter blade moves through the nip between them the tangential speed of each blade is essentially the same as the longitudinal speed of the portion of the continuous strip to cut a plate from the continuous strip. In some implementations, the process may also include determining an angular location of a cutter blade as it will be moved through the nip to determine whether such cutter blade will cut a plate from the continuous strip in a desired location and if not accelerating or decelerating rotation of the cutter to cut the continuous strip in essentially the desired location.

In at least some implementations, an apparatus for cutting plates from a continuous strip of a plurality of connected grids may include a rotatable cutter with at least two cutter blades with cutting edges equally circumferentially spaced apart and extending substantially parallel to an axis of rotation of the cutter, an anvil rotatable about an axis of rotation parallel to the cutter axis of rotation, a conveyor for moving at least a portion of a continuous strip toward the cutter and anvil, a first servo motor for powering the conveyor to advance the continuous strip toward the cutter and anvil, a second servo motor for rotating the cutter blades for cooperation with the anvil to cut in a nip between them a plate from the continuous strip of the connected grids, a lug sensor upstream of the cutter to provide an electric signal indicative of each lug of a grid of the continuous strip that is moved by the conveyor past the lug sensor, and an electronic controller including a processor with the controller using signals from the lug sensor to control the first servo motor to drive the conveyor to move at least a portion of the continuous strip at essentially a predetermined longitudinal speed toward the cutter and anvil and controlling the second servo motor to rotate the cutter so that the cutting edge of each cutter blade moves through the nip to cut a plate from the continuous strip at a tangential speed which is essentially the same as the longitudinal speed of the portion of the continuous strip being moved by the conveyor past the lug sensor and toward the cutter.

In at least some implementations, the apparatus may also include a blade sensor for providing an electric signal to determine a position of a cutter blade relative to the desired cut location and if there is a phase error between them the controller initiates an adjustment by either accelerating or decelerating the rotary speed of the cutter and/or the longitudinal speed of the conveyor to eliminate the phase error.

In some implementations, the apparatus may include an encoder providing an electric signal indicative of the conveyor speed and the controller uses this signal and the lug sensor signal to calculate the longitudinal distance between successive lugs of the continuous strip to determine and make any needed corrections in the cutter rotary speed or the conveyor linear speed so that each blade cuts the continuous strip in the desired location between immediately adjacent grids of the strip.

In at least some implementations, the controller is configured to receive an input of a predetermined desired longitudinal speed for advancing the continuous strip toward the cutter and the processor uses this desired speed to command the first servo motor to drive the conveyor at essentially this desired speed and to command the second servo motor to rotate the cutter so that when the cutting edge of one of its cutter blades when it is in the nip has a tangential speed essentially equal to the desired longitudinal speed of the continuous strip.

In some implementations, the controller may be configured to receive an input of a desired longitudinal distance between each cut of a continuous strip and use this predetermined distance, the desired longitudinal speed of the continuous strip, the number of blades of a cutter, and a radius from the axis of rotation of the cutter to the cutting edge of its blades to determine the command speed at which the second servo motor will rotate the rotary cutter.

In at least some implementations, the controller may use at least the lug sensor signal and a feedback signal from an encoder of the first servo motor to determine the lug to lug distance of longitudinally adjacent grids of the continuous strip to adjust the tangential speed of the cutting edges of the blades to cut a plate from the continuous strip at essentially a predetermined location between a trailing edge and a leading edge of adjacent grids of the strip.

BRIEF DESCRIPTION OF THE DRAWINGS

The following detailed description of certain presently preferred embodiments and the best mode, will be set forth with reference to the accompany drawings, in which.

DETAILED DESCRIPTION

Figure 1:
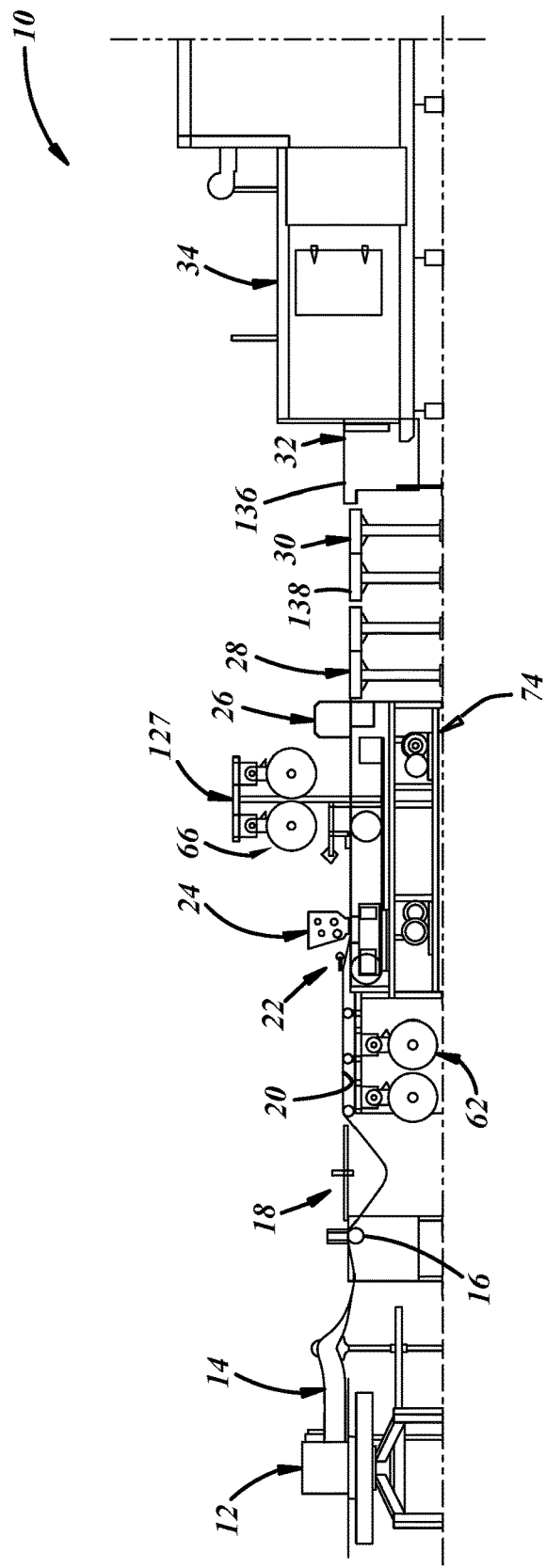
FIG. 1 is a schematic side view of a lead-acid battery grid pasting and plate cutting line in which an embodiment of the battery plate cutter, system and process of this invention may be used.

Referring in more detail to the drawings, FIG. 1 illustrates a portion of a production line 10 for pasting a continuous strip of a plurality of connected battery grids and cutting the continuous strip into individual pasted pates for use in making lead-acid batteries. This line can be used in processes that produce plates for lead-acid batteries for cars, trucks, hybrid vehicles, motorcycles, boats, snowmobiles, golf carts, consumer equipment such as powered wheelchairs and lifts, industrial equipment such as forklifts and robots, and for other applications.

As shown in FIG. 1, in general the production line 10 may have a de-reeler 12 that de-reels or unwinds a spooled continuous strip 14 of battery grids and rotates an unwound portion of the strip from a generally vertical to a generally horizontal plane where it then passes over a powered pick up roller 16 of a loop assembly 18 from which the strip advances onto a conveyor 20 of a pasting machine 22 with a hopper 24 which applies an electrochemical active paste material onto and over the grid strip. The pasted grid strip then advances through a cutter 26 which cuts the pasted continuous grid strip into individual pasted battery plates which may be longitudinally spaced apart by an exit conveyor 28 and if in pairs laterally spaced apart by diverging conveyors 30. The plates may then be carried by a conveyor 32 through a flash drying oven 34 to remove some moisture from the electrochemically active paste material. After exiting the flash drying oven the pasted plates are further processed in the overall manufacture and assembly of a lead-acid battery including curing and forming of the plates.

Figure 2:
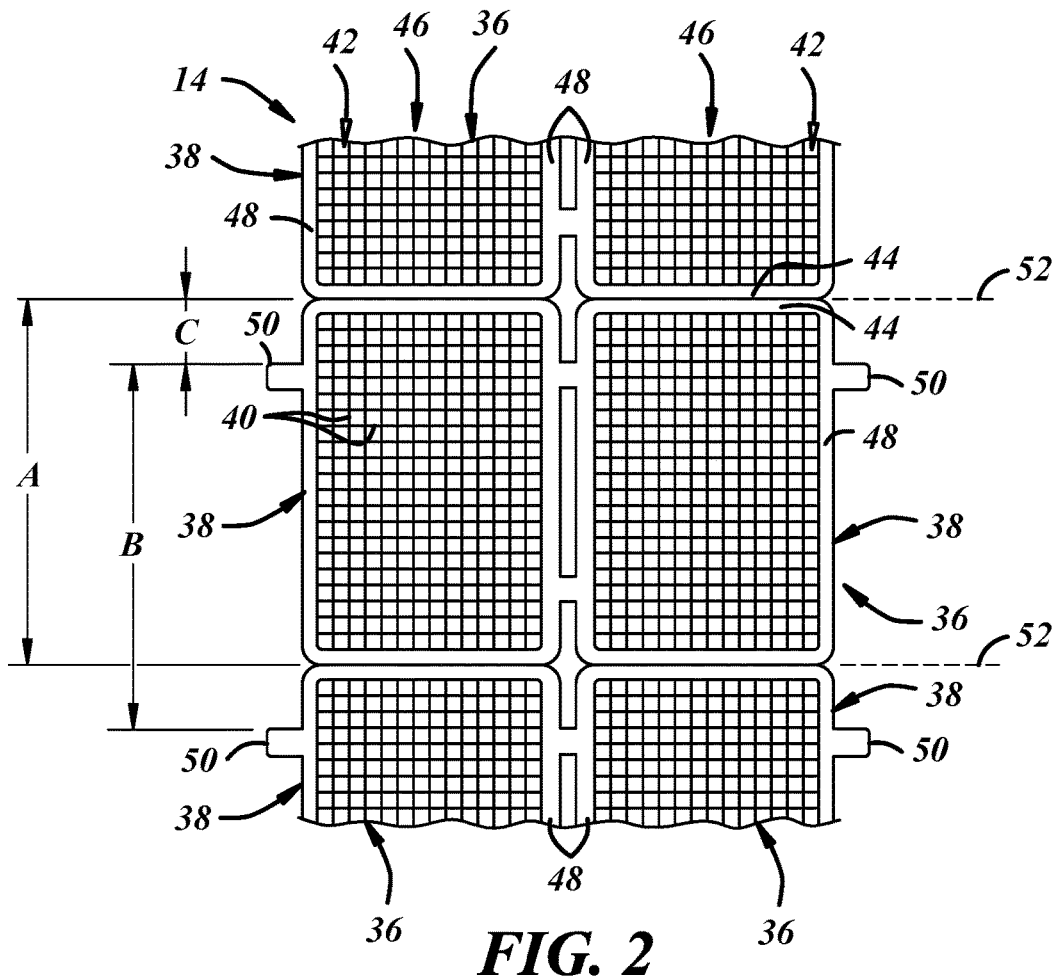
FIG. 2 is a fragmentary top view of a continuous strip of a plurality of pairs of battery lead grids longitudinally connected together.

As shown in FIG. 2, the continuous strip has a plurality of grids 36 typically each with a peripheral frame 38, and a crisscrossing set of generally horizontal and vertical wires 40 interconnected at nodes with open spaces 42 between the wires to receive the battery paste material. The strip has a plurality of grids 36 longitudinally connected together between adjacent lateral segments 44 of the frames 38 of adjacent grids and may have two rows 46 of grids with adjacent longitudinal frame segments 48 connected together. Each grid has a lug 50 with a leading edge accurately located relative to a leading laterally extending frame segment 44 and thus a desired location of a lateral cut line 52 for separating each pasted grid from the continuous strip. The lugs 50 are shown as integral with the outer longitudinal frame segments 40 although alternatively the lugs can be integral with the longitudinal inboard frame segments 48. The grids of a continuous lead alloy strip can also be made by an expanded metal process with integral outer or inner lugs but without a peripheral frame 38 as is well known in the art. The lugs of the expanded metal grids will be accurately located relative to the desired location of their lateral cut line 52. Alternatively, the grid strip can have a single row 46 or line of grids with adjacent laterally extending segments 44 of the frames 38 of adjacent grids connected together.

Figure 3:
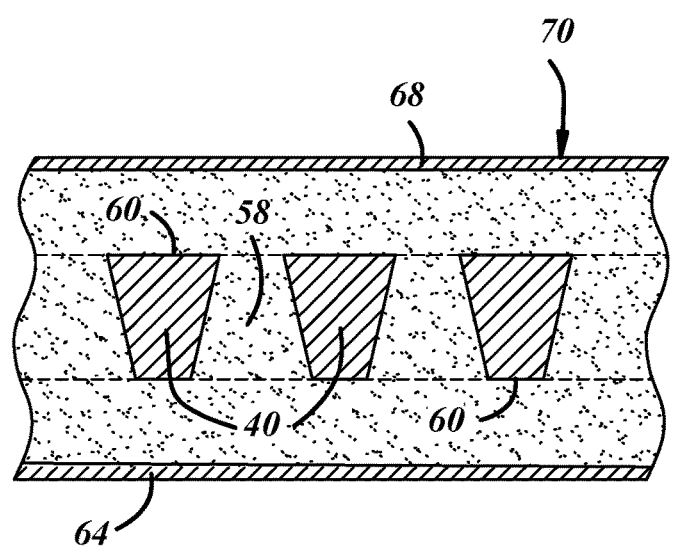
FIG. 3 is a fragmentary sectional view of a grid with pasting material applied thereto and received between pasting papers.

The conveyor 20 of the pasting machine may have a continuous belt 54 (FIGS. 4 & 5) with an upper run 56 which advances the continuous strip 14 under the paste hopper 24 which applies paste material 58 (FIG. 3) onto the grids and into the spaces 42 between the grid wires and preferably overpastes both faces 60 of the grid wires 40 so that they are embedded in the paste material. Typically this type of pasting machine 22 has a mechanism 62 which unrolls a sheet of pasting paper 64 upstream of the paste hopper so that it lies between the upper belt run 56 and the lower face 60 of the continuous strip 14 and downstream of the hopper a mechanism 66 which unrolls and applies a continuous sheet of pasting paper 68 to the upper face 60 of the pasted continuous strip. As shown in FIG. 3 this produces a pasted strip 70 in which the grid wires 40 are embedded in the active paste material 58 with some of the paste material outboard of both faces 60 of the grid strip (overpasted) and with the outer faces of the paste covered by and in contact with pasting papers 64, 68. The pasting papers prevent the paste of the pasted grids and plates from sticking to the processing equipment, conveyor belts and the like as is well known to persons of ordinary skill in the art.

Figure 4:
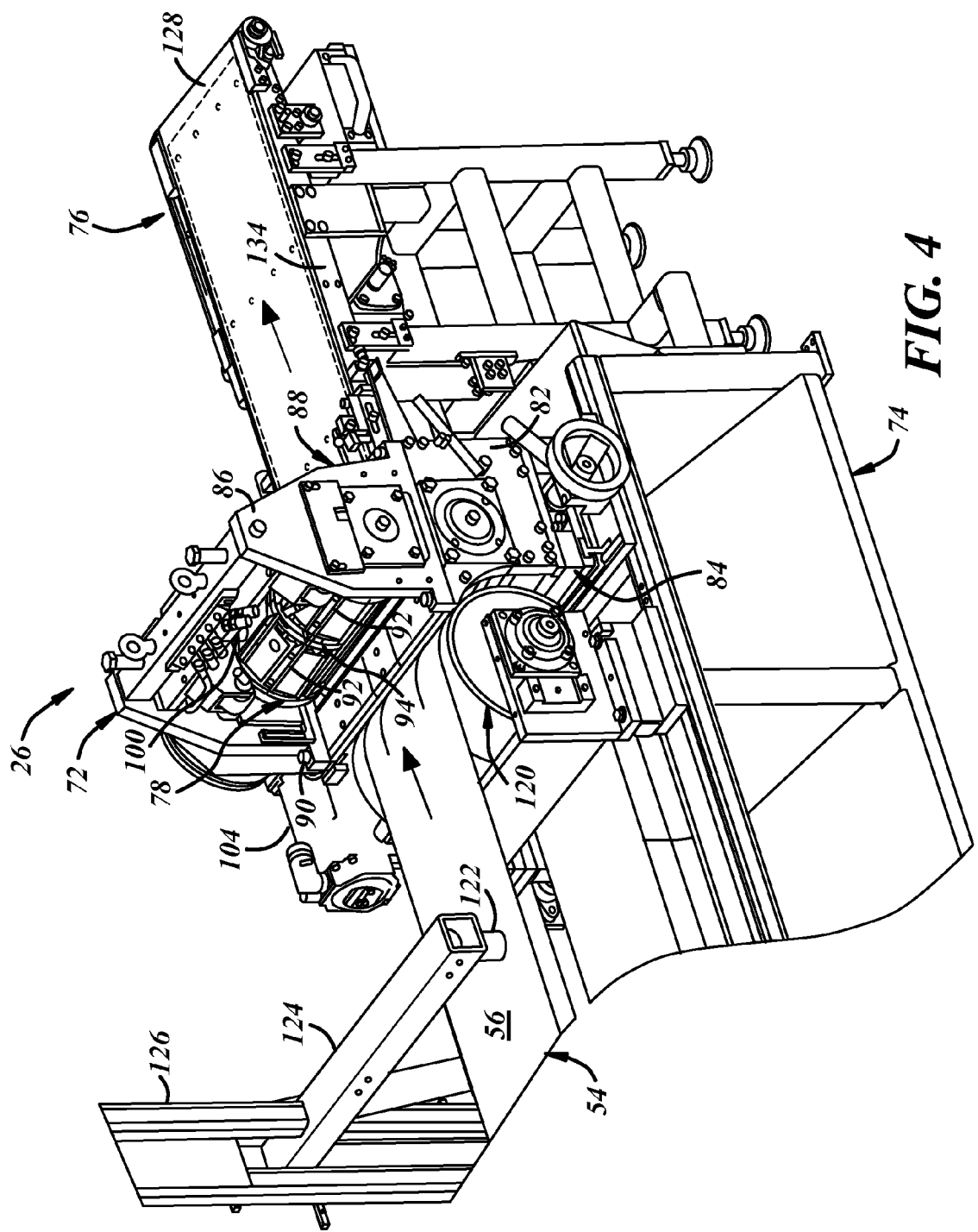
FIG. 4 is a perspective view of one side of the plate cutter with guards removed.
Figure 5:
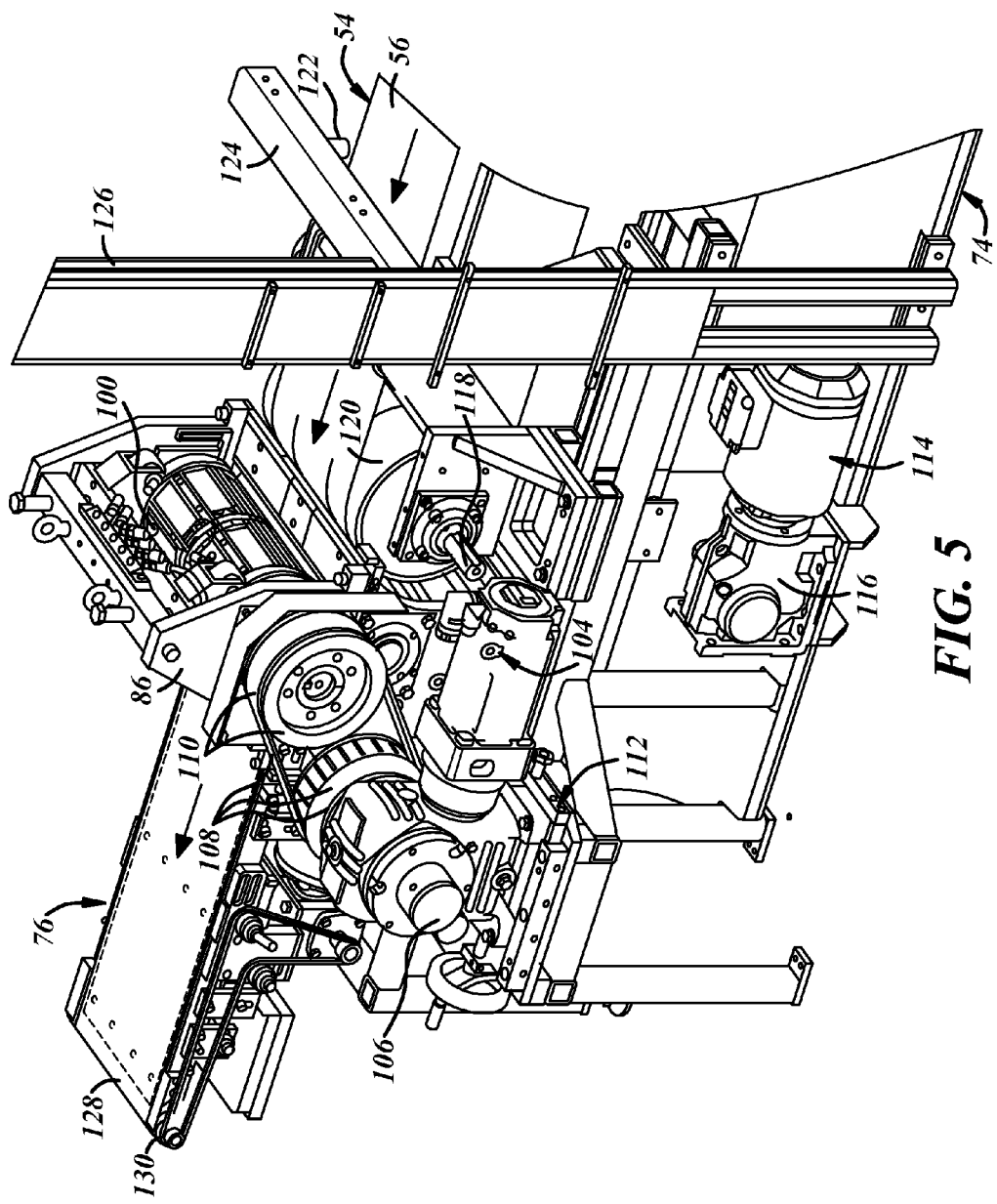
FIG. 5 is a fragmentary view of the other side of the plate cutter with guards removed.

As shown in FIGS. 4 and 5, at the downstream end of the paster belt 54 the pasted continuous strip 70 with the pasting papers thereon is transferred into the cutter 26 which has a cutting assembly 72 mounted on a base frame 74 and associated with an exit conveyor 76. The cutting assembly 26 has a rotatable cutter head 78 and a cooperating rotatable anvil 80 which in operation cuts or severs individual pasted battery plates from the continuous strip. The anvil 80 may be a cylindrical roller or drum journaled for rotation in spaced apart uprights 82 of a carriage 84 carried by the frame 74. Preferably the carriage 84 is movable laterally relative to the pasted continuous strip 70 to laterally align the cutter assembly with the pasted continuous strip. The cutter head 78 is journaled for rotation in spaced apart uprights 86 of a sub-frame 88 with its axis of rotation essentially parallel to the axis of rotation of the anvil 80. Preferably the cutter head axis and the anvil axis also lie in a plane substantially perpendicular to the longitudinal path of travel of the continuous strip into the cutter assembly. To facilitate changing the cutter head assembly, such as removing it for off-line service and/or cutter blade sharpening or replacement, and installing another cutter head assembly, the sub-frame 88 is preferably removably attached by four cap screws 90 to the uprights 82 of the carriage 84 of the anvil assembly.

Figure 6:
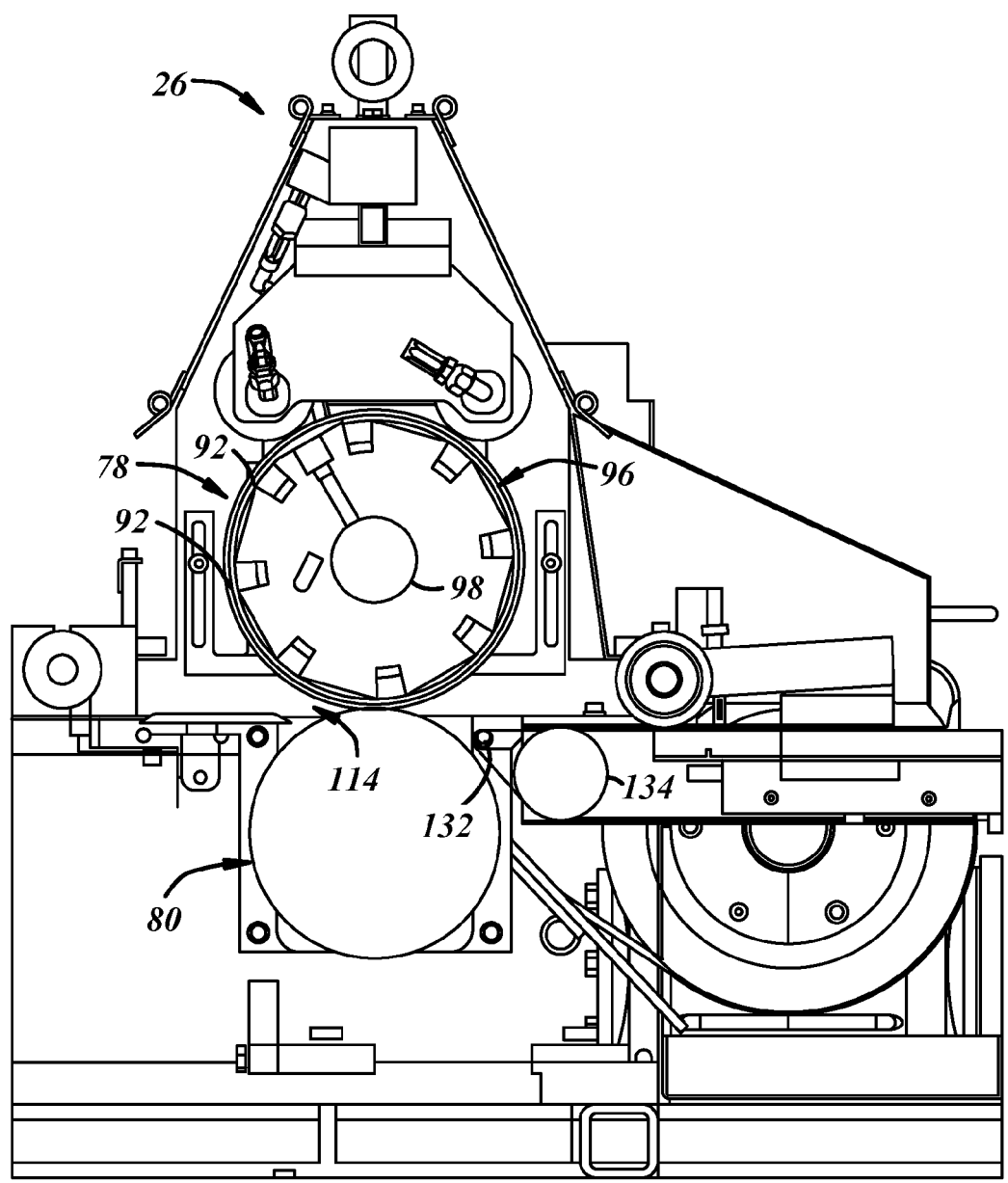
FIG. 6 is a fragmentary sectional view of the cutter assembly of FIGS. 4 & 5.

The cutter head 78 has at least one and preferably a plurality of equally circumferentially spaced apart cutter blades 92 or knives with a cutting edge extending generally parallel to the axis of rotation of the cutter head and transversely or laterally to the pasted continuous strip 70. Desirably the cutter head 78 has a separate set of a plurality of cutter blades 92 for each of the two rows 46 or lines of grids of the continuous strip. Desirably, but not necessarily, to longitudinally cut or sever the laterally adjacent pasted grids or panels of the strip, the cutter head also has a plurality of cutter blades 94 with an arcuate and circumferentially extending cutting edge which blades are received between spaced apart adjacent ends of the lateral cutter blades 92. Desirably all of these blades are removably received on and carried by a drum 96 which as shown in FIG. 6 is secured to a driven shaft 98 for rotation in unison therewith. The shaft 98 is journaled for rotation in the spaced apart uprights 86 of the sub-frame 88.

A blade sensor 100 provides an electric signal indicating a home or reference position of the blades to an electronic control 102 to facilitate in operation the blades laterally cutting the pasted plates from the continuous strip in the desired locations 52. Alternatively, this home or reference signal could be provided by an encoder.

The cutter head 78 is rotatably driven by a servo motor 104 desirably through a right angle gear box 106 operably connected by cog pulleys 108 and a belt 110 to the driven shaft 98 of the cutter head. To facilitate adjustment of the tension of the cog belt 110 desirably this servo motor and gear box are slidably carried by a carriage 112 carried by the frame 74 and movable along a path essentially perpendicular to the axis of rotation of the driven shaft 98 of the cutter head.

In operation the tangential speed of the periphery of the anvil cylinder 80 is essentially equal to the tangential speed of the cutting edge of the lateral blades 92 of the cutter head 80 so that at a nip 114 between them they are moving at the same tangential speed and thus there is no relative tangential speed between them. This may be achieved in various ways such as by a gear train, cog pulleys and a belt, a chain and sprockets or the like connecting the driven shaft 98 of the cutter head 78 with the cylindrical anvil 80 to rotate the anvil cylinder at a fixed ratio relative to rotation of the driven shaft 98. Alternatively, the anvil cylinder 80 could be driven by a servo motor responsive to a command speed from the electronic control 102 determined from an encoder signal of the rotary speed of the driven shaft 98.

So that the tangential speed of the lateral cutter blades 92 and the anvil drum 98 can be synchronized by the electronic control 102 with the linear longitudinal speed of the strip 70 of pasted grids, the paster conveyor belt 54 is driven by a servo motor 114 desirably through a right angle gear box 116 with an output shaft operably connected by cog pulleys and a belt, a gear train, sprockets and a chain, or the like, to a driven shaft 118 attached to a driven drum 120 on which the continuous belt 54 is received which belt is also received over a tail drum (not shown).

As best shown in FIG. 4, a lug sensor 122 is positioned by an arm 124 of a support structure 126 over the conveyor belt 54 to provide to the electronic control 102 an electric signal indicative of the leading edge of each lug 50 of a row 46 of the successive grid plates of the strip 70 as it passes by the sensor. As the cut or severed individual plates emerge from the cutter assembly they are received and carried away on a continuous belt 128 of the exit conveyor 76. This belt is received over a driven drum 130 (FIG. 5) and a tail roller 132 (FIG. 6) each journaled for rotation in bearings carried by side rails 134. In use, the upper run of this belt 128 is driven at a linear speed at least equal to the speed at which the individual cut plates emerge or are discharged from the cutter assembly 72 and desirably at a somewhat faster speed to provide a linear space or gap between adjacent individual plates received on the conveyor belt 128 to facilitate downstream transfer of the plates either directly onto a conveyor belt 136 of the flash drying oven 34 or indirectly by a conveyor 30 having two continuous individual belts with upper runs 138 which laterally diverge somewhat between their upstream and downstream ends to provide further lateral separation of each laterally adjacent pair of plates which may facilitate both flash drying of the plates in the oven 34 and/or removal of the plates from the downstream end of the oven conveyor 32 and stacking of the plates for further processing.

Figure 7:
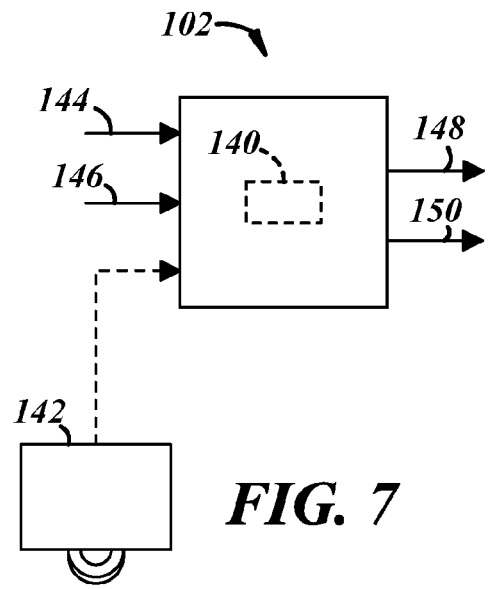
FIG. 7 is a schematic diagram of an electronic control of the plate cutter and system.

As shown schematically in FIG. 7, the cutter and system are controlled and operated by the electronic control 102 which has, among other things, a CPU, clock, programmable memory, etc. such as a microprocessor and may be in the form of a programmable controller 140 with an interface for receiving an input of data such as from a touch screen 142, personal computer, keypad or the like. In operation the controller 140 receives an electrical signal input 144 from the cutter blade homing sensor 100 or an encoder and also an electrical signal input 146 from the lug sensor 122. An operator through a touch screen or other device inputs to the controller the desired or target lineal speed at which the conveyor 20 in operation will longitudinally move the pasted continuous strip 70 toward and into the cutter assembly 72 and the desired longitudinal distance or spacing A (FIG. 2) between adjacent successive lateral cut lines 52 between leading and trailing lateral frame segments 44 of successive grids of the continuous strip. Normally this distance A is equal to or slightly greater than the longitudinal distance B between the leading edge of immediately adjacent successive lugs 50 of a row of grids of the strip. Usually each grid of each row of the strip is designed to have the same lineal distance C between a leading edge of its leading lateral frame segment 44 and the leading edge of its lug 50. Either the operator inputs or the controller is pre-programmed and retains in non-volatile memory the diameter or radius of the driven paster conveyor drum 120 and the diameter or radius from the axis of the cutter head 78 to the tip of the cutting edges of the lateral cutter blades 92 or the ratio between them, and the number of lateral cutter blades 92 of the cutter head. With this data and suitable software, the processor 140 calculates and determines the appropriate command rotary speed for each of the first servo motor 104 driving the cutter head 78 and the second servo motor 114 driving the paster conveyor 20 so that in operation these servo motors through error feedback loops will drive the conveyor and rotate the cutter head at their respective command speeds so that the longitudinal lineal speed of the pasted continuous strip on the paster conveyor 54 will be equal to the tangential speed of the tip of the cutting edge of the lateral cutting blades 92 at the nip between the blades 92 and the anvil 80 of the cutter assembly and these speeds will be essentially constant and substantially equal to the operator inputted paster conveyor strip 70 speed. If the diameter of the conveyor driven drum 120 is equal to the diameter of the tip of the cutting edges of the lateral cutting blades 92 then the calculated command speed will be the same speed for both of these servo motors assuming their gear boxes have the same gear ratios and their drive trains have the same ratios.

Figure 8A:
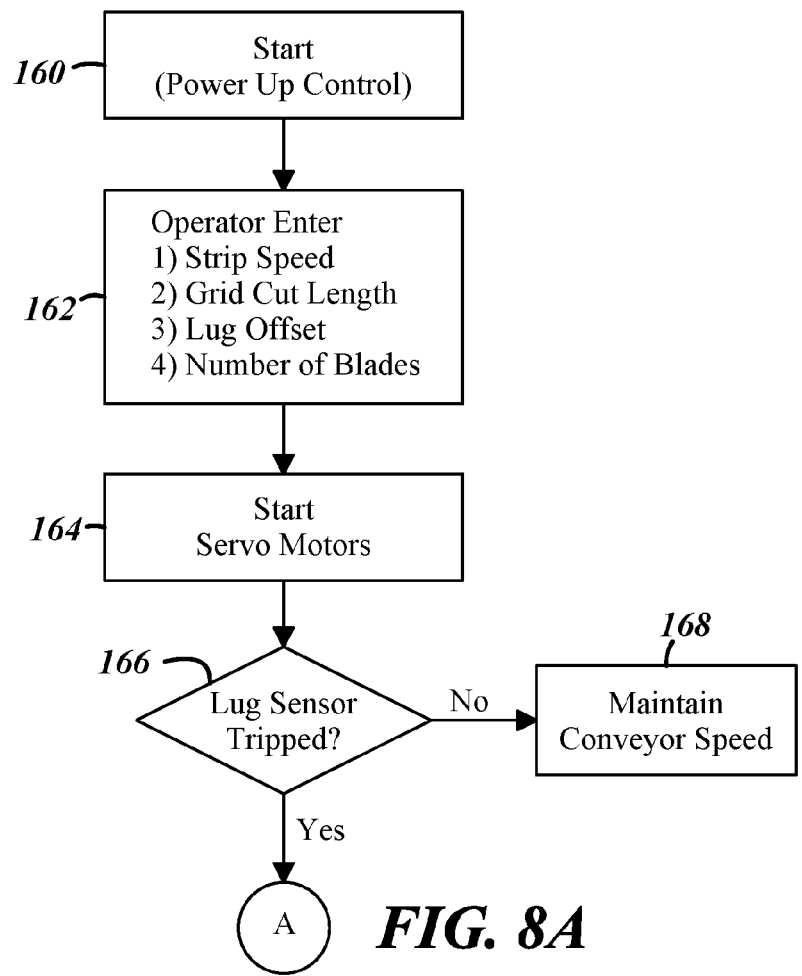
FIGS. 8A & B is a flow chart of at least some of the steps implemented by the electronic control.

At least some of the steps performed by the controller 102 and its processor 140 in operation of the cutter 26 and system are illustrated in the flow chart of FIGS. 8A & B. At the start step 160 the operator powers up the control 102 and processor 140, the cutter blade sensor 100 and lug sensor 122. At step 162 the operator uses the touch screen 142 or other processor communication device to enter into a non-volatile memory of the processor 140 a desired lineal speed at which the continuous strip 70 will be advanced into the cutter 26, for example 100 feet/minute, the predetermined desired longitudinal length of grids to be cut from the strip 14 which is essentially the distance A between successive cuts or cut lines 52, for example 6.00 inches, the offset or longitudinal distance between an intended cut line 52 and the leading edge of an immediately succeeding lug 50, for example 1.00 inch, and the number of cutter blades 92 on the cutter head 78, for example 4. In non-volatile memory the processor 140 can also permanently retain the diameter or radius of the drum 120 driven by the servo motor 114 of the paster conveyor 20 which advances the continuous strip into the cutter 26. Alternatively, the operator could enter the diameter of this driven drum 120 if a cutter is used with a feed or entry conveyor with a drive drum of a different diameter. With this data and suitable algorithms of mathematical expressions which are well known to skilled persons and thus will not be reiterated herein, the processor calculates the speed at which the conveyor servo motor 114 will rotate the drum 120 to advance the continuous strip 14 into the cutter 26 at the lineal strip speed entered by the operator and will also calculate the speed at which the servo motor 104 will rotate the cutter head 78 so that the tangential speed of the cutting edge of the blades 92 will be the same as the operator inputted lineal speed at which the strip 14 will be advanced into the cutter 26. This tangential speed at which the servo motor 104 rotates the cutter head 78 can be calculated and determined based on the operator inputted distance A between cut lines 52, the number of blades, and the strip speed.

At step 164, with the continuous strip 70 received on the conveyor belt 54 the operator starts the servo motors 104 and 114 to rotate both the cutter head 78 and the driven drum 120 of the conveyor 20 at their respective calculated speeds. At step 166, the processor 140 determines whether the lug sensor 122 is being tripped or indicating successive lugs 50 are passing by it, and if not, continues to maintain the servo motors respective speeds and continues to check whether successive lugs are passing by or tripping the lug sensor. If the lug sensor is being tripped by successive lugs 50, the processor 140, desirably at essentially the same time, proceeds with both the left hand and right hand branches of steps shown in FIG. 8B which will be discussed first with respect to the right hand side of the flow chart and then the left hand side of the flow chart.

At step 170, the processor determines the actual lug to lug distance using at least the input from the lug sensor 122 and the longitudinal speed at which the continuous strip 70 is being advanced into the cutter 26 by the conveyor 20. Desirably, but not necessarily, in optional step 172 the respective distances between several successive lugs is retained in a buffer on a first in, first out (FIFO) basis. For example, the processor 140 compares the average lug to lug distance for a first set of a fixed number of lug distances such as ten, to the average of the lug distances for an immediately succeeding or preceding second set of ten lug distances to determine if there is any difference between them and if so determines the extent of any increase or decrease in the distance between successive sets of lug to lug distances. At step 174, if there is no change in the distances, the processor commands the cutter blade servo motor 104 to continue rotating the cutter head at the same speed or speed ratio to the conveyor speed controlled by the conveyor servo motor 114 and the buffer 172 continues to determine the lug to lug distance in each succeeding set of the same fixed number of lug distances. However, if the lug to lug distance between successive sets increases, at step 176 the processor 140 calculates and determines the decreased cutter head speed needed to adjust for this increase in distance and commands the cutter servo motor 104 to rotate the cutter head 78 at this decreased servo motor speed. Alternatively, if the lug to lug distance of successive sets decreases at step 180, the processor determines the increased servo cutter speed needed to adjust for this lug to lug distance decrease and at step 182 commands the servo motor 104 to rotate the cutter head at this increased speed.

Figure 8B:
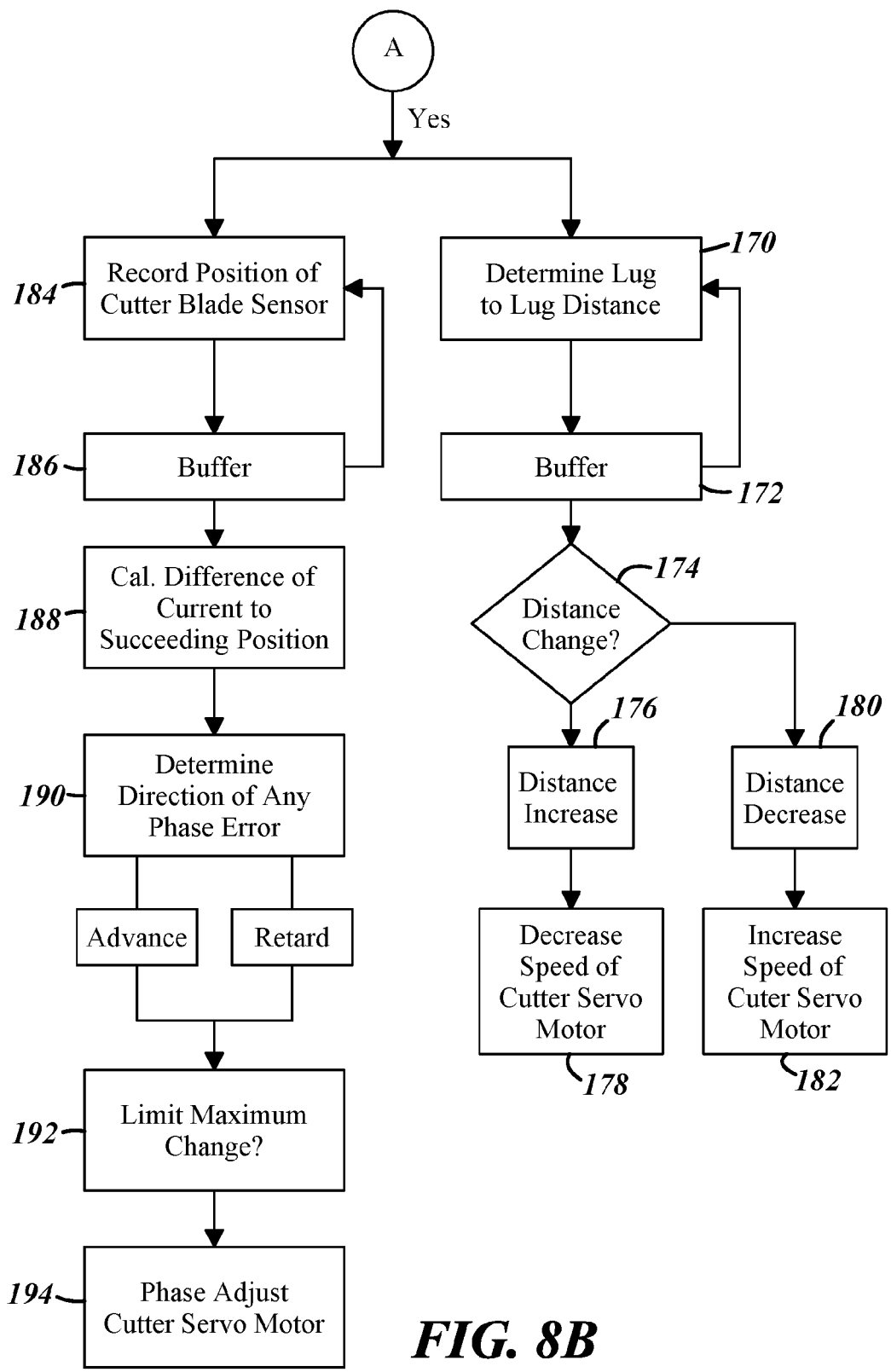

At essentially the same time and as shown on the left hand side of FIG. 8B, the processor 140 changes the phase of the cutter blades 92 if, and as needed, so that each blade cuts a grid from the continuous strip at the intended location 52 as the cutting edge of the blade passes through the nip between such blade 92 and the anvil roller or drum 80. At step 184 the processor retains in memory the angular phase position of cutter blades indicated by the input 144 from the cutter sensor 100 and desirably, but not necessarily, optionally at step 186 retains in a buffer a first set of a fixed number, for example 20, of successive sensed angular phase positions on a FIFO basis. At step 188 the processor determines the extent of any difference between the angular phase positions of an immediately succeeding or preceding second set of angular phase positions of the blades or, if no buffer is used, between immediately succeeding sensed angular phase positions of the blades, and if there is no difference, maintains the angular phase relationship of the cutter blades. However, if there is a difference in step 190, the processor determines the direction of the phase error and thus whether the blades need to be advanced or retarded relative to the continuous strip to cut grids in the proper locations. In step 192, the processor determines and if need be, limits the maximum extent to which the blades can be advanced or retarded so that changing the angular phase position of the blades occurs only while all of the blades are disengaged from the continuous strip and, determines the magnitude and duration of the speed change the cutter servo motor 104 needs to make to correct the angular phase position error and at step 194, commands the servo motor 104 to momentarily increase or decrease its speed for a defined period of time to make this angular phase position adjustment.

Desirably, throughout the operation of the cutter 26, the processor 140 substantially continuously monitors and as needed, changes the rotary speed of a cutter head 78 to adjust for changes in the actual lug to lug distance between successive lugs passing by the lug sensor 122 and/or adjusts the angular phase position of the cutter blades 92 to cut successive pasted grids from the continuous strip 70 at the correct location 52.

In operation, based on the signal 146 from the lug sensor 122 the processor 140 determines or calculates the actual lineal speed of the pasted continuous grid strip carried by the paster conveyor 54, compares this calculated actual speed to the command conveyor speed through error feedback loops controls, and if need be, varies both servo motor speeds to achieve and maintain their respective commanded speeds. The blade home position sensor 100 also provides to the processor an electrical signal 144 indicating the actual angular position of the cutting edges of the lateral cutting blades 92 which the processor compares to the desired position 52 for cutting a pasted grid from the continuous strip 70 and if they differ, causes the cutter servo motor 104 to momentarily slightly speed up or slow down the rotary speed of the cutter head 78 to provide a proper angular phase position adjustment so that the cutting edge of each one of its lateral blades 92 as it passes through the nip between such blade cutting edge and the anvil 80 is in longitudinal alignment with the intended cut line 52 of a pasted grid from the continuous strip to thereby separate succeeding pasted grids 36 from the continuous strip 14 at the desired location 52.

This processor 140 can also use the signal or pulses 146 from the lug sensor 122 and feedback from the encoder of the conveyor servo motor 114 to determine and compensate for any irregular stretching that has occurred of grids of the strip 70 so that any stretched grids are laterally cut or severed at the correct location 52 between the adjacent trailing and leading lateral frame segments 44 of the adjacent pasted grids. For example, the lug sensor signal or pulses 146 and this servo motor encoder can be used by the processor 140 to calculate the actual lug-to-lug distance (first lug to immediately succeeding lug) and use this actual distance to determine and use a command speed for the cutter servo motor 104 to cut the pasted grid having the second or latter lug at the correct location 52 between its trailing lateral frame segment and the adjacent leading lateral frame segment of the succeeding pasted grid of the strip. This routine can be repeated seriatim for each succeeding lug and its associated grid.

If desired, a sensor 152 providing an electric signal indicative of the depth or extent of the slack loop 18 of the continuous grid strip 14 can also be provided to the processor 140 of the control 102 and used to maintain this depth within appropriate limits by slightly increasing or decreasing the command speeds at which the servo motors drive the paster conveyor belt 54, and the cutter head 78 so that increasing these command speeds decreases the depth of the loop and decreasing these command speeds increases the depth of the loop. For example the depth of this loop may be easily and readily maintained in a desired range such as 10 inches to 20 inches below the plane of the rollers on which the continuous grid strip 14 is received.

One suitable electronic control 102, may include the Allen Bradley components of a microcontroller 1769-L30ERMS COMPACT GUARDLOGIX CONTROL, a cutter servomotor MPM-B1652E-MJ72AA MPM 480V AC RTRY Servo Motor with a power cable 2090-CPW7DF-10AF20 20M PWR FLEX CBL SPEEDTE and a feedback cable 2090-CFBM7DD-CEAF20 20M FEEDBACK FLEX CBL SP, a paster conveyor servo motor MPL-B310P-MJ72AA MOTOR SERVO 1.58 NM 5000 with a power cable 2090-CPWM7DF-16AF20 20M PWR FLEX CBL SPEEDTE and a feedback cable 2090-CFBM7DD-CEAF20 20M FEEDBACK FLEX CBL SP, a microcontroller for both of these servo motors 2198-D057-ERS3 KINETIX 5700 DUAL AXIS I and a touch screen 2711P-T7C21D8S PANEL VIEW PLUS 7 GRAPHIC TERMINAL. If a rotary shaft encoder is used to determine the home position of the blades it can be an Allen Bradley encoder 842HR-MJDZ115FWYD SINE COSINE ENCODER. The blade home sensor 100 may be a Proximity Sensor No. 18 UM12-AP6X-H1141 available from Turck. The lug sensor 122 may be a Laser sensor No. GVH45 & GV21P available from Keyence Laser.

A presently preferred suitable electronic control 102, may include the Allen Bradley components of a whole machine microcontroller 1769-L30ERMS COMPACT GUARDLOGIX CONTROL, a cutter servomotor MPM-B1652E-MJ72AA MPM 480V AC RTRY Servo Motor with a power cable 2090-CPW7DF-10A30 30M PWR STANDARD CBL SPEEDTE and a feedback cable 2090-CFBM7DF-CEAA30 30M FEEDBACK, STANDARD CBL SP, a paster conveyor servo motor MPL-B310P-MJ72AA MOTOR SERVO 1.58 NM 5000 with a power cable 2090-CPWM7DF-16AA30 30M PWR STANDARD CBL SPEEDTE and a feedback cable 2090-CFBM7DF-CEAA30 30M FEEDBACK STANDARD CBL SP, a microcontroller for both of these servo motors 2198-D057-ERS3 KINETIX 5700 DUAL AXIS I, a power supply for this servo motor microcontroller 2198-P070 and a 24 volt DC bus bar 2198-TCON-24VDCIN36 for connection between this microcontroller and the cutter servomotor and a bus for 2198-H070-P-T for connection between this microcontroller and the conveyor servomotor, feedback kit for connecting the servo motor feedbacks to the servomotor microcontroller, and a touch screen 2711P-T7C21D8S PANEL VIEW PLUS 7 GRAPHIC TERMINAL. If a rotary shaft encoder is used to determine the home position of the blades it can be an Allen Bradley encoder 842HR-MJDZ115FWYD SINE COSINE ENCODER and a feedback kit 2198-K57CK-D15M and a cable 2090-XX-NFMF-530 cable for connecting the encoder with the servomotor microcontroller. The blade home sensor 100 may be a Proximity Sensor No. 18 UM12-AP6X-H1141 available from Turck. The lug sensor 122 may be a Laser Sensor No. GVH45 & GV21P available from Keyence Laser.

A prototype of this cutter 26, system and process when operating with the conveyor 54 advancing a pasted continuous strip 70 of lead grids toward and into the cutter assembly 26 at a rate of 150 lineal feet per minute and with a longitudinal cutting dimension A of 5.40 inches has a cutting accuracy of plus or minus 0.005 inch of the intended cutting location 52. In contrast, previously known commercially available pasted continuous strip grid cutter equipment and systems have a cutting accuracy of plus or minus 0.040 inch of the intended cutting location when operating with a pasted grid strip conveyor advancing its continuous strip toward and into the cutting equipment at a rate of 150 lineal feet per minute with a designed lineal distance A of 5.40 inches. Since a typical automotive battery plate has a lateral segment of its frame with a width or longitudinal dimension in the range of about 4.00 to 5.75 inches, the prior art cutter equipment significantly decreased the width of the lateral frame segment by as much as 50% percent which adversely affects further handling and assembly of such battery plates into batteries and decreases the useful life in service of such batteries due to increased grid corrosion.

While the invention disclosed herein constitutes presently preferred embodiments, many others are possible, and it is not intended herein to mention all the possible equivalent forms, modifications or ramifications of the invention. For example, the cutter 26 could be used with other types of pasters including pasters which do not have a belt conveying the continuous grid strip under the hopper, use of a separate conveyor downstream of the paster and driven by the conveyor servo motor 114, use of the cutter 26 to cut or sever individual unpasted lead battery grids from a continuous strip of connected together battery grids, among other modifications. It is understood that the terms used herein are merely descriptive, rather than limiting, and that various changes and modifications may be made without departing from the spirit or scope of the invention.

The invention claimed is:

1. An apparatus for cutting plates from a continuous strip of a plurality of connected grids comprising:
    a rotatable cutter having an axis of rotation and at least two cutter blades with a cutting edge and the cutting edges of the blades equally circumferentially spaced apart and extending substantially parallel to the axis of rotation;
    an anvil rotatable about an axis of rotation parallel to the axis of rotation of the cutter;
    a conveyor for moving at least a portion of a continuous strip of a plurality of battery grids connected together toward the cutter and anvil;
    a first servo motor operably connected with the conveyor for powering the conveyor to advance the continuous strip toward the cutter and anvil;
    a second servo motor operably connected with the cutter for rotating the cutter blades in cooperation with the anvil to cut in a nip between each blade and the anvil a plate from the continuous strip of connected grids;
    a lug sensor upstream of the cutter and configured to provide an electric signal indicative of each lug of a grid of the continuous strip that is moved by the conveyor past the lug sensor;
    a blade sensor or encorder to provide a blade home electric signal indicative of the circumferential or angular location of a cutter blade; and
    an electronic controller including a processor, the controller using signals from the lug sensor to control the first servo motor to drive the conveyor to move at least a portion of the continuous strip received on the conveyor at essentially a predetermined longitudinal speed toward the cutter and anvil and controlling the second servo motor to rotate the cutter so that the cutting edge of each cutter blade as it moves through the nip between the cutting edge of such blade and the anvil to cut a plate from the continuous grid has a tangential speed which is essentially the same as the tangential speed of the portion of the continuous strip being moved by the conveyor past the lug sensor and toward the cutter, and the controller using the lug sensor signal and the blade home electric signal to determine whether a blade will cut a plate from the continuous strip in a desired location and if not accelerates or decelerates the second servo motor to cause the cutter blades to cut the continuous strip in essentially the desired location.

2. The apparatus of claim 1, wherein the controller uses the lug sensor and blade home sensor signals to determine the position of a cutter blade relative to the desired cut location and if there is a phase error between them, initiates an adjustment by either accelerating or decelerating the rotary speed of the cutter to eliminate the phase error.

3. The apparatus of claim 1, which also comprises a conveyor encoder providing an electric signal indicative of the conveyor speed, and the controller uses this signal and the lug sensor signal to calculate the longitudinal lug-to-lug distance between successive lugs of the continuous strip to determine and made any needed correction in the cutter rotary speed so that each blade cuts the continuous strip in the desired location between immediately adjacent grids.

4. The apparatus of claim 1, wherein the controller is configured to receive an input of a predetermined desired longitudinal speed for advancing the continuous strip toward the cutter and anvil and the processor uses this desired speed to command the first servo motor to drive the conveyor at essentially this inputted desired speed and the controller also uses this inputted desired speed to command the second servo motor to rotate the cutter so that when the cutting edge of one of the cutter blades is in the nip between such cutting edge and the anvil it has a tangential speed essentially equal to the inputted predetermined desired longitudinal linear speed of the continuous strip.

5. The apparatus of claim 4, wherein the controller is configured to receive an input of a predetermined desired longitudinal distance between each cut of the continuous strip and uses at least this predetermined distance, the predetermined desired longitudinal speed of the continuous strip, the number of blades of the cutter and a radius from the axis of rotation of the rotary cutter to the cutting edge of the blade to determine the command speed at which the second servo motor will rotate the rotary cutter.

6. The apparatus of claim 5, wherein the conveyor comprises an endless belt received over a cylindrical driven drum having an axis of rotation and a radius from such axis of rotation to a peripheral cylindrical surface of the driven drum engaged by the belt and this radius is equal to the radius of the rotary cutter from its axis of rotation to the cutting edge of each of the blades of the rotary cutter and the controller uses the same command rotary speed for both the first servo motor and the second servo motor.

7. The apparatus of claim 1, wherein the controller uses at least the lug sensor signal and a feedback signal from an encoder of the first servo motor to determine the lug-to-lug distance of longitudinally adjacent grids of the continuous strip to adjust the tangential speed of the cutting edges of the blades to cut a plate from the continuous strip at essentially a predetermined location between a trailing edge and a leading edge of adjacent grids of the strip.

* * * * *